United States Patent [19]

Belart et al.

[11] Patent Number: 4,578,951
[45] Date of Patent: Apr. 1, 1986

[54] DUAL-CIRCUIT HYDRAULIC BRAKE SYSTEM

[75] Inventors: Juan Belart, Walldorf; Jochen Burgdorf, Offenbach-Rumpenheim, both of Fed. Rep. of Germany

[73] Assignee: ITT Industries, Inc., New York, N.Y.

[21] Appl. No.: 560,525

[22] Filed: Dec. 12, 1983

[30] Foreign Application Priority Data

Dec. 22, 1982 [DE] Fed. Rep. of Germany ....... 3247497

[51] Int. Cl.⁴ .......................................... B60T 13/68
[52] U.S. Cl. ...................................... 60/545; 60/563; 60/591; 60/581; 303/6 C; 303/119; 303/114
[58] Field of Search ................. 60/545, 563, 591, 581, 60/582, 555; 91/32, 33; 303/6 C, 119, 114, 113

[56] References Cited

U.S. PATENT DOCUMENTS

| | | | |
|---|---|---|---|
| 3,712,176 | 1/1973 | Meyers | 91/33 |
| 3,727,986 | 4/1973 | Koivunen | 60/548 |
| 3,918,765 | 11/1975 | Hayashida | 60/582 |
| 4,203,631 | 5/1980 | Rivetti et al. | 60/548 |
| 4,305,571 | 12/1981 | Hystad | 60/486 |
| 4,404,803 | 9/1983 | Steffes | 60/591 |
| 4,415,210 | 11/1983 | Belart et al. | 303/6 C |
| 4,449,369 | 5/1984 | Dauvergne | 60/563 |
| 4,477,125 | 10/1984 | Belart et al. | 60/582 |
| 4,492,413 | 1/1985 | Belart et al. | 303/114 |

FOREIGN PATENT DOCUMENTS 2084676 4/1982 United Kingdom ................. 60/582

Primary Examiner—Robert E. Garrett
Assistant Examiner—Richard S. Meyer
Attorney, Agent, or Firm—James B. Raden; William J. Michals

[57] ABSTRACT

The present invention relates to a dual-circuit hydraulic brake system with slip control, in particular for automotive vehicles, wherein wheel brakes (26, 27, 41, 42) are connected via electromagnetically actuatable multiple-position valves (38, 39, 88, 40, 24, 89) to brake circuits which are hydraulically isolated from one another, wherein the brake circuits are adapted to be pressurized by a tandem master cylinder (1), on the one hand, and are connectible to a dual-circuit pump aggregate (76, 77) adapted to be driven electromotively, on the other hand. Both outlets of the pump aggregate (76, 77) are connected to normally closed brake valves (43, 44) which are governed by the master cylinder pressure and separating valves (11, 12) which are adapted to be closed by the outlet pressure of the brake valves (43, 44) are inserted into the connections between the tandem master cylinder (1) and the wheel brakes (26, 27, 41, 42).

1 Claim, 1 Drawing Figure

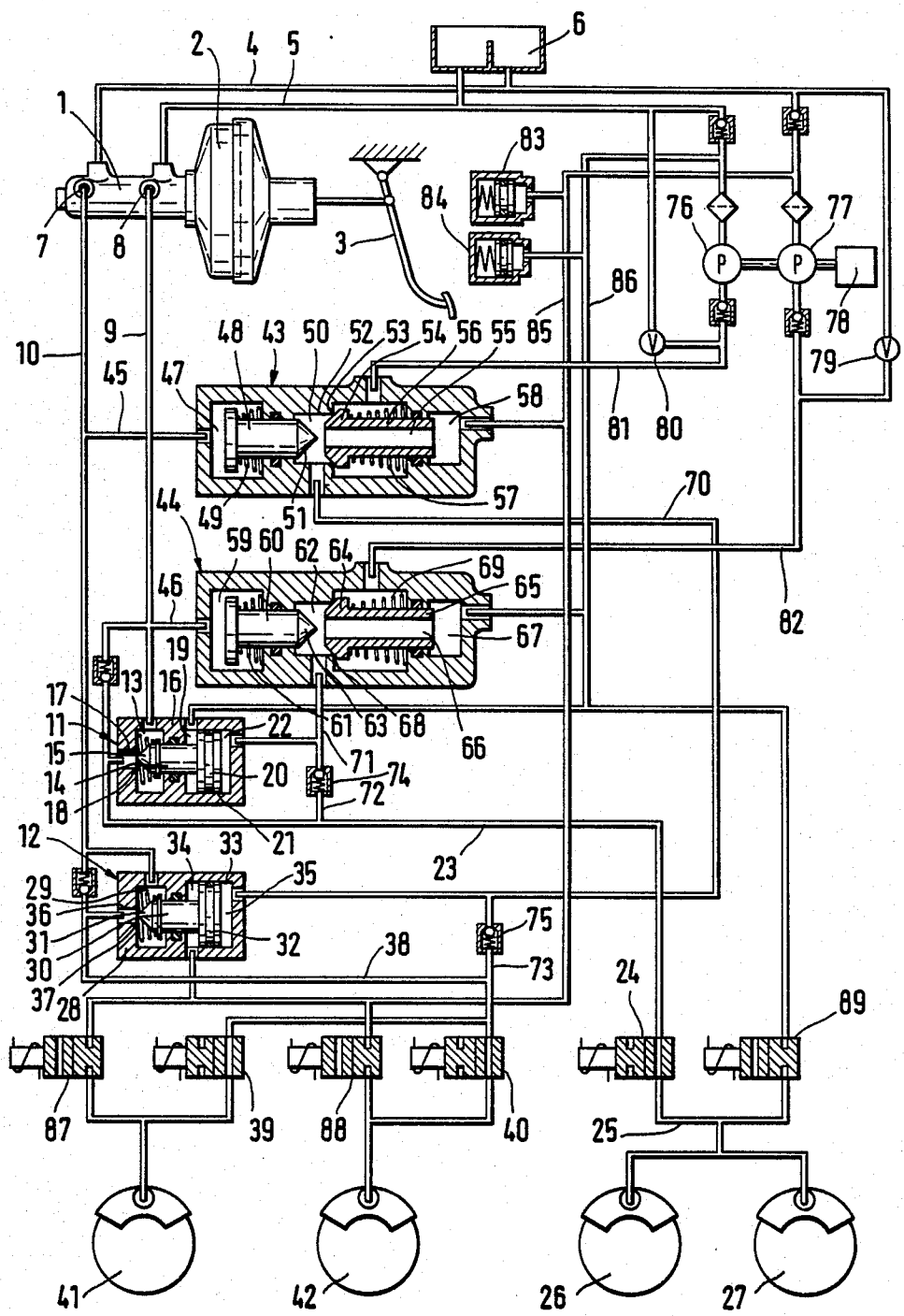

DUAL-CIRCUIT HYDRAULIC BRAKE SYSTEM

BACKGROUND OF THE INVENTION

The present invention relates to a dual-circuit hydraulic brake system with slip control, in particular for automotive vehicles, wherein wheel brakes are connected via electromagnetically actuatable multiple-position valves to brake circuits which are hydraulically isolated from one another, wherein the brake circuits are pressurizable by a tandem master cylinder, on the one hand, and connectible to a dual-circuit pump aggregate that is adapted to be driven electromotively, on the other hand.

A hydraulic brake system comprising the preceding features is known for instance from the print "Bosch-Technische Berichte", volume 7, (1980), number 2.

The brake system described in this print comprises substantially a tandem master cylinder with a vacuum brake booster connected upstream thereof, wherein a first working chamber of the tandem master cylinder pressurizes jointly the wheel brake cylinders at the rear axle of an automotive vehicle, while the second working chamber of the tandem master cylinder serves for the pressure supply of the wheel brakes at the front axle of the automotive vehicle. Inserted into the connection between the first working chamber of the tandem master cylinder and the wheel brakes of the rear axle of the automotive vehicle is a solenoid valve controllable by slip control electronics, which valve, in the de-energized state, establishes a free passage to the first working chamber of the tandem master cylinder, while it interrupts said connection in a second position and in a third position provides for a condition in which the first working chamber of the tandem master cylinder is isolated from the wheel brakes of the rear axle of the automotive vehicle and pressure fluid is taken from the wheel brakes fed by the first working chamber.

The wheel brakes at the front axle of the automotive vehicle are supplied with pressure from the second working chamber of the tandem master cylinder, with each connection between the second working chamber of the tandem master cylinder and a wheel brake at the front axle of the automotive vehicle including an electromagnetically actuatable multiple-way valve which, in respect of its function, corresponds to the electromagnetically actuatable valve in the connection between the first working chamber of the tandem master cylinder and the wheel brakes at the rear axle of the automotive vehicle. A multiple-circuit brake system will be accomplished by a like combination, wherein the wheel brakes at the rear axle of the automotive vehicle will be controlled jointly in respect of slip, while the wheel brakes of the front axle are controllable individually.

A change of the switching position of one of the electromagnetically actuatable valves results at the same time in the start-up of an electromotively driven dual-circuit pump aggregate which during slip control in the phase of pressure build-up supplies a corresponding auxiliary pressure to the wheel brakes.

It has to be regarded as a disadvantage in the brake system described that in the phases of pressure build-up during slip control always the outlet pressure of the pump aggregate becomes effective in the wheel brake cylinders. This may have as a consequence that the braking pressure rises very quickly during the control action so that a new locked condition may occur in a correspondingly short period of time. Hence follows that relatively great pressure differences will be encountered during slip control. Besides, the outlet pressures of the dual-circuit pump aggregate will enter directly into the working chambers of the tandem master cylinder so that strong pulsation will be felt at the brake pedal during slip control what may under certain circumstances contribute to diverting the driver's attention from traffic in a braking situation which is critical anyway.

It is therefore an object of the present invention to provide a multiple-circuit hydraulic brake system with slip control comprising the features initially referred to, wherein the operation of the pump aggregate has no influence on the position of the brake pedal.

SUMMARY OF THE INVENTION

This object is achieved by the present invention in that both outlets of the pump aggregate are connected to normally closed brake valves which are governed by the master cylinder pressure, and in that separating valves which are adapted to be closed by the outlet pressure of the brake valves are inserted into the connections between the tandem master cylinder and the wheel brakes. It will be accomplished in a favourable manner by a like design that, in the initial phase of braking, the braking pressure will first be supplied via the opened separating valves to the wheel brakes, while a travel- or pressure-responsively acting switching member is provided at the master cylinder which starts the drive of the pump aggregate. As soon as a corresponding pressure is generated by the pump aggregate, the separating valves will close, thereby causing closure of the connections between the tandem master cylinder and the wheel brakes. The brake valves will now serve to modulate the outlet pressures of the pump aggregate in dependence on the pressures in the working chambers of the tandem master cylinder so that during brake slip control the pressure made available by the pump aggreagate will not be fed directly to the wheel brakes, but takes a course which is dependent upon the respective actuating force. In case of failure of the energy supply taken care of by the pump aggregate and the electric motor due to disturbance, the separating valves will remain opened so that the wheel brakes are actuatable directly by the tandem master cylinder. The split-up of the brake circuits is preferably chosen such that one of the brake valves governs the pressure supply to the wheel brakes of the rear axle, while the other brake valve governs the pressure supply to the wheel brakes of the front axle. The brake system described fulfils its function correspondingly, if a vacuum brake booster is connected upstream of the tandem master cylinder. It will thus be rendered possible in a simple and favourable manner to combine the brake system proposed retrospectively with already existing hydropneumatic brake systems.

The brake valves and the separating valves of the inventive brake system are preferably designed as seat valves, each of the separating valves containing a valve piston provided with an axial bore. One end face of the valve piston is displaceable into an unpressurized chamber, while a valve closure member is shaped at the other end face of the valve piston preloaded towards a valve seat, and an annular chamber connected to a pump outlet is adapted to be closed by said valve closure member. It will be furthermore a particularly straightforward design feature to arrange coaxially to the valve piston a piston which is adapted to be acted upon by the pressure of the master cylinder, by which latter piston the axial bore of the valve piston is closable and the valve closure member shaped at the valve piston is adapted to lift from the valve seat subsequently. In a favourable fashion, normally unpressurized chambers are formed between the valve pistons and the pistons of the brake valves which chambers are each in hydraulic communication with a closure piston of a separating valve.

BRIEF DESCRIPTION OF THE DRAWING

One embodiment of the present invention will be described in more detail in the following with reference to the accompanying drawing in which the single FIGURE illustrates a dual-circuit hydraulic brake system with slip control.

DETAILED DESCRIPTION

In the drawing, reference numeral 1 designates a tandem master cylinder, upstream of which a vacuum brake booster 2 is connected which, in turn, is actuatable through a brake pedal 3. The tandem master cylinder 1 is in communication with an unpressurized supply reservoir 6 via pressure lines 4, 5. The tandem master cylinder 1 contains in addition two housing ports 7, 8 to which pressure lines 9, 10 are connected. The pressure line 9 is in hydraulic communication with a separating valve 11, while the pressure line 10 is hydraulically connected to a separating valve 12.

The separating valve 11 disposes of an inlet chamber 13 accomodating an axially slidable piston 14 whose left-hand end, when viewing the drawing, is designed as valve closure member 15. Coaxially relative to the piston 14, a bore 17 is designed in the housing 16 of the separating valve 11 which bore terminates into the inlet chamber 13 and forms at this port a valve seat 18 adapted to be closed by the valve closure member 15. The piston 14 is designed as a stepped piston and projects in a sealed manner into a chamber 19 which is constantly unpressurized. The larger piston step 20 of the piston 14 is guided in a cylinder bore 21, and the right-hand end face, when viewing the drawing, of the larger piston step 20 confines a chamber 22. A pressure line 23 leads from the bore 17 to an electromagnetically actuatable two-way/two-position valve 24 which, when de-energized, permits free hydraulic passage and is, in turn, connected via a pressure line 25 to wheel brakes 26, 27 at the rear axle of an automotive vehicle.

The separating valve 12 is designed alike the separating valve 11 and disposes of a housing 28, an inlet chamber 29 and a piston 30 which carries a valve closure member 31 at its right-hand end, when viewing the drawing, and is guided with a larger piston step 32 in a cylinder bore 33. The separating valve 12 contains furthermore a chamber 34, which is constantly unpressurized, and a chamber 35 which is confined by the end face of the larger piston step 32. In addition, the separating valve 12 contains a bore 36 which terminates into the inlet chamber 29 and forms a valve seat 37 opposite to the valve closure member 31. A pressure line 38 leads from the bore 36 to electromagnetically actuatable two-way/two-position valves 39, 40 which, in the inactive position illustrated in the drawing, establish a hydraulic connection to wheel brakes 41, 42 at the front axle of the automotive vehicle.

Further components of the brake system illustrated in the drawing are brake valves 43, 44, to which the pressure prevailing at the housing ports 7, 8 of the tandem master cylinder is supplied via pressure lines 45, 46. The brake valve 43 comprises an inlet chamber 47 in which a piston 48 is axially slidably guided and loaded by a compression spring 49. The right-hand end of the piston 48, when viewing the drawing, projects into a control chamber 50 and is designed as valve closure member 51. The control chamber 50, on the other hand, is confined by a bore 52 which enlarges radially outwardly and constitutes a valve seat 53. Movable into abutment on the valve seat 53 is a valve closure member 54 which is part of a piston 56 provided with an axial bore 55 and biased against the valve seat 53 by a compression spring 57. The right-hand end of the piston 56, when viewing the drawing, projects in a sealed manner into a chamber 58 wherein there is constantly prevailing atmospheric pressure.

The brake valves 43, 44 are of identical design, an inlet chamber 59 of the brake valve 44 being in communication with the housing port 8 of the tandem master cylinder 1 via the pressure lines 46, 9. Projecting into the inlet chamber 59 of the separating valve 44 is a piston 60 which is loaded by a compression spring 61. The right-hand end of the piston 60, when viewing the drawing, projects in a sealed manner into a control chamber 62 and is likewise designed as valve closure member 63. Projecting furthermore into the control chamber 62 is a piston 65 provided with a valve closure member 64, the said piston disposing of an axial bore 66 and extending with its right-hand end, when viewing the drawing, into a constantly unpressurized chamber 67. The valve closure member 64 of the piston 65 cooperates likewise with a valve seat 68 of the separating valve 44 and is biased against the valve seat 68 by a compression spring 69.

Pressure lines 70, 71 lead from the control chambers 50, 62 of the brake valves 63, 64 to the chambers 22, 35 of the separating valves 11, 12. Furthermore, the pressure lines 70, 71 have connections 72, 73 to the electromagnetically actuatable two-way/two-position valves 39, 40, 24, with check valves 74, 75 being inserted in said connections 72, 73.

In the brake system illustrated in the drawing, a dual-circuit pump aggregate 76, 77 which is adapted to be driven by an electric motor 78 is provided for making available auxiliary hydraulic energy. Said electric motor 78 will for instance be put into operation after the brake pedal 3 has performed an adjustable travel. Connected in parallel to the dual-circuit pump aggregate 76, 77 are pressure-relief valves 79, 80 which limit the outlet pressures of the pump aggregate 76, 77. The suction sides of the pump aggregate 76, 77 are connected to the unpressurized supply reservoir 6, while the pressure sides communicate via lines 81, 82 with the brake valves 43, 44. Besides, pressure accumulators 83, 84 are connected to the suction sides of the pump aggregate 76, 77 which, in turn, are connected via pressure lines 85, 86 with electromagnetically actuatable two-way/two-position valves 87, 88, 89. Said electromagnetically actuatable two-way/two-position valves 87, 88, 89 are closed in the de-energized state, thus preventing escape of the pressure fluid supplied to the wheel brakes 41, 42, 26, 27.

The mode of operation of the brake system described will be explained in more detail hereinbelow, starting from the brake's release condition in which no actuating force is applied to the brake pedal 3 and all movable parts assume their position to be seen in the drawing. When an actuating force is applied to the brake pedal 3, pressure will develop in the working chambers of the tandem master cylinder 1 assisted by the vacuum brake booster. This pressure is supplied via the housing ports 7, 8 and the pressure lines 9, 10 to the separating valves 11, 12 which are opened at first. Via the pressure lines 23, 38, the pressure generated in the tandem master cylinder 1 will thus propagate to the wheel brakes 26, 27, 41, 42. The pressure prevailing in the tandem master cylinder 1 will furthermore be supplied via the pressure lines 45, 46 to the inlet chambers 47, 59 of the brake valves 43, 44 so that the pistons 48, 60 will be displaced to the right, when viewing the drawing, in opposition to the force of the compression springs 49, 61, as a result whereof the valve closure members 51, 63 shaped at the pistons 48, 60 will move into abutment on the ports of the axial bores 55, 66 of the pistons 56, 65 and isolate the control chambers 50, 62 from the unpressurized supply reservoir 6.

Simultaneously with the application of the brakes, the electric motor 78 will be started and cause the dual-circuit pump aggregate 76, 77 to generate hydraulic pressure which is supplied via the pressure lines 81, 82 to the brake valves 43, 44. In this arrangement, pressure limitation of the outlet pressures of the pump aggregate 76, 77 is effected by the pressure-relief valves 79, 80 which return the pressure fluid delivered by the pump aggregate 76, 77 to the unpressurized supply reservoir 6 in the event of adjustable pressure values being exceeded. When the actuating force applied to the brake pedal 3 is increased, finally a pressure will be accomplished in the inlet chambers 47, 49, upon attainment of which the pistons 56, 65 will be displaced to the right, when viewing the drawing, in opposition to the compression springs 57, 69 so that the valve closure members 54, 64 lift from the valve seats 53, 68 and pressurized fluid is fed to the control chambers 50, 62. The pressure brought about this way in the control chambers 50, 62 is proportional to the actuating force exerted on the brake pedal and will be supplied via the pressure lines 70, 71 to the chambers 22, 35 of the separating valves 11, 12, thus causing displacement of the pistons 14, 30 of the separating valves 11, 12 to the left, when viewing the drawing, and abutment of the valve closure members 15, 31 on the valve seats 18, 37. The connections between the tandem master cylinder 1 and the wheel brakes 26, 27, 41, 42 will be interrupted in this switching position. Pressurization of the wheel brakes will now be performed by the hydraulically actuated brake valves 43, 44 which supply the pressure prevailing in the control chambers 50, 62 via the connections 72, 73 to the wheel brakes 26, 27, 41, 42.

When slip control electronics not shown recognize a critical condition at one or at several of the vehicle wheels, the two-way/two-position valves 39, 40, 24 assigned to the vehicle wheels will be switched over so that the pressure in the wheel brakes 41, 42, 26, 27 remains constant. In case it is necessary for preventing a locked condition to decrease the pressure in one or in several of the wheel brakes 26, 27, 41, 42, the electromagnetically actuatable two-way/two-position valves 87, 88, 89, too, will be switched over so that pressure fluid is taken from the wheel brakes 26, 27, 41, 42 and flows into the pressure lines 85, 86. The pressure fluid taken from the wheel brakes 26, 27, 41, 42 will be partly received by the pressure accumulators 83, 84. In the process of release of the brake, the course of motion described will be reversed until finally, when the brake is released, the movable parts have re-assumed their position to be seen from the drawing.

If on account of a disturbance of the pump aggregate 76, 77 no pressure develops in the pressure lines 81, 82, the separating valves 11, 12 will remain in an opened position in which the wheel brakes 26, 27, 41, 42 are pressurized by the tandem master cylinder 1 directly.

What is claimed is:

1. A multi-circuit slip controlled hydraulic brake system for a vehicle comprising:

a plurality of wheel brakes connected to hydraulically isolated hydraulic brake circuits, said connections controlled by electromagnetically actuatable multiple-position valves;

a tandem master cylinder adapted to pressurize said hydraulic brake circuits;

a pluraliy of brake valves and an electromotively driven pump aggregate having at least one pump outlet, each said brake valve connected to a pump outlet, said brake valves controlled by master cylinder pressure;

a plurality of separating valves incorporated hydraulically between said master cylinder and said wheel brakes, each said separating valve controlled by said brake valves wherein a predetermined level of master cylinder pressure opens said brake valves wherein pump aggregate pressure closes said separating valves, whereby said pump aggregate pressurizes said hydraulic brake circuits;

wherein said brake valves include a first and a second piston, each said piston having a first end and a second end, each said piston reciprocable coaxially, wherein said second piston is provided with an axial throughgoing bore, said second piston sealingly slideable into a chamber, the first end of said second piston forming a valve closure member shaped to abut a valve seat, said second piston biased so said first end of said second piston abuts said valve seat thereby sealing an annular chamber hydraulically connected to a pump outlet, and wherein said first piston is biased in the same direction as said second piston and controlled by master cylinder pressure such that a selected level of master cylinder pressure displaces said first piston whereby said second end of said first piston is abutted against said first end of said second piston sealing said axial bore in said second piston, and such that a selected increased level of master cylinder pressure displaces both said first and said second pistons displacing said first end of said second piston from said valve seat unsealing said annular chamber; and, wherein a chamber is provided by said first and second pistons in their said biased positions, said chamber being hydraulically connected with a closure piston of one of said separating valves.

* * * * *